May 1, 1945.   N. J. SMITH   2,374,786
INDICATING THERMOMETER
Filed June 3, 1942    5 Sheets-Sheet 1

Inventor.
Norman J. Smith
by Geo. R. Woodworth
Att'y.

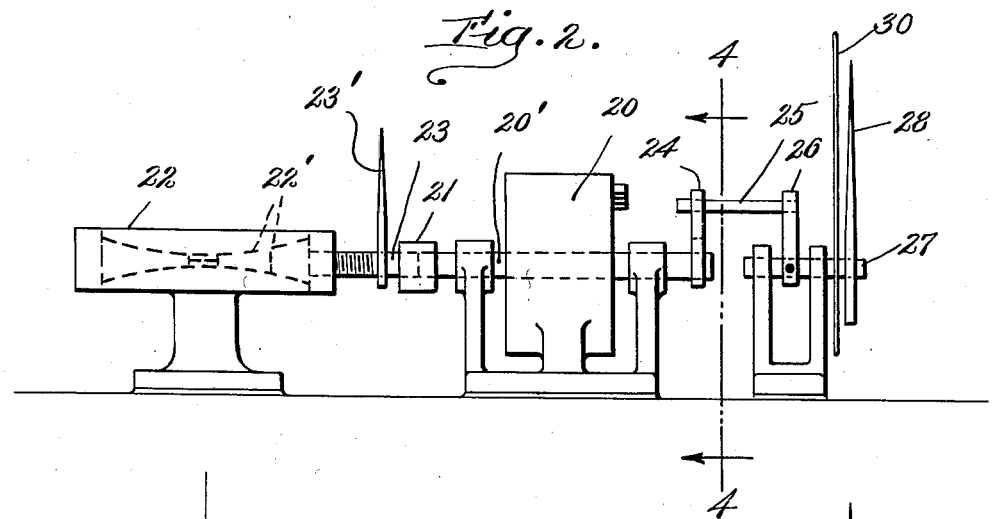
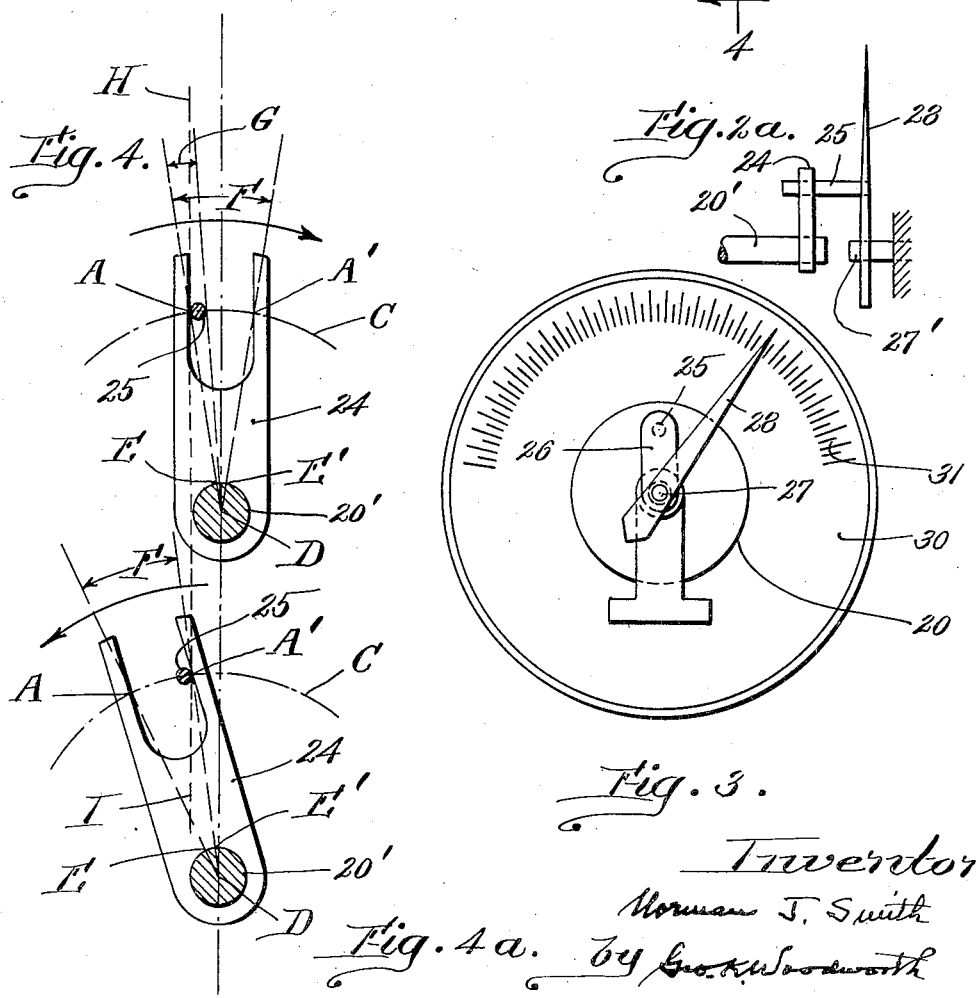

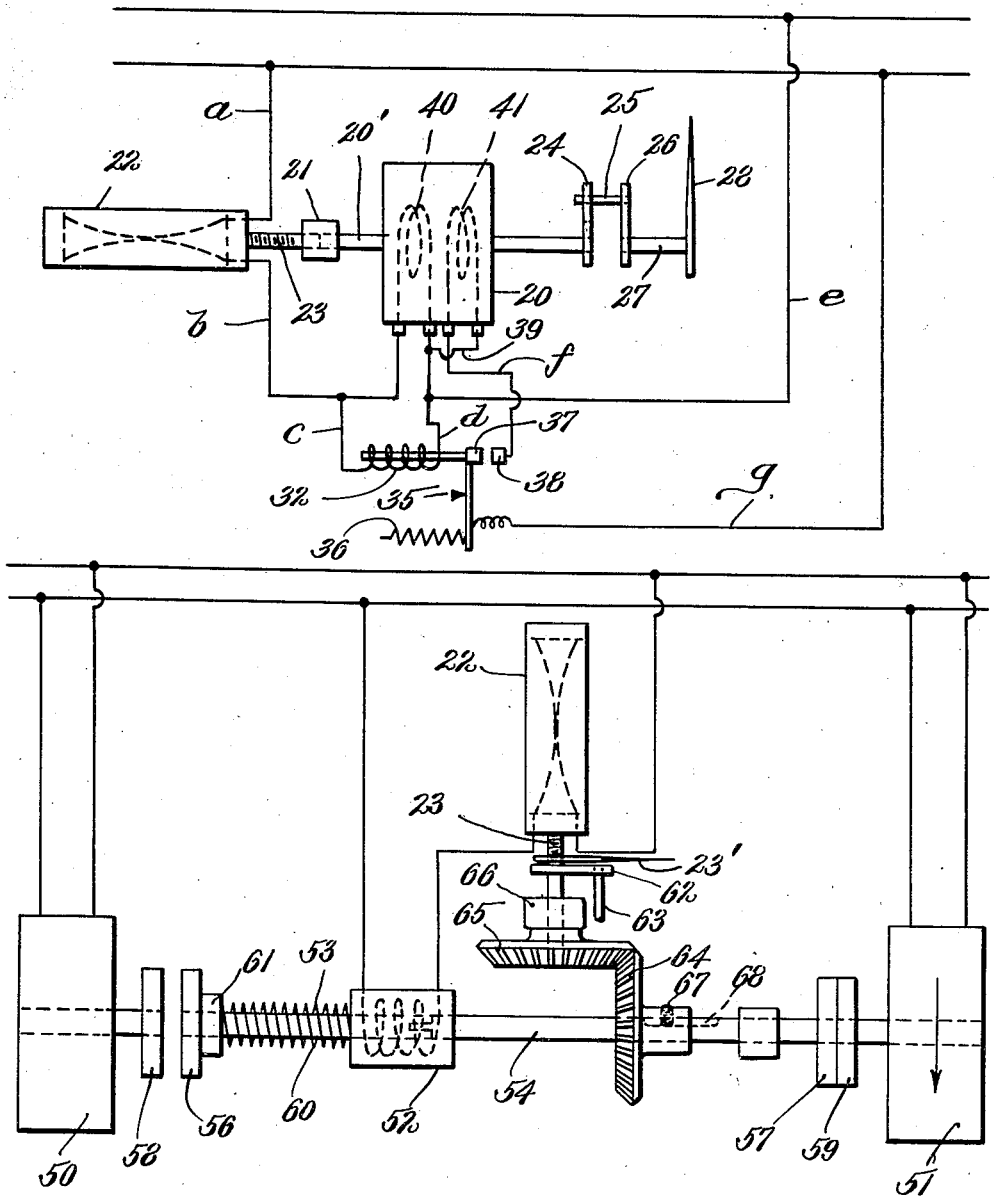

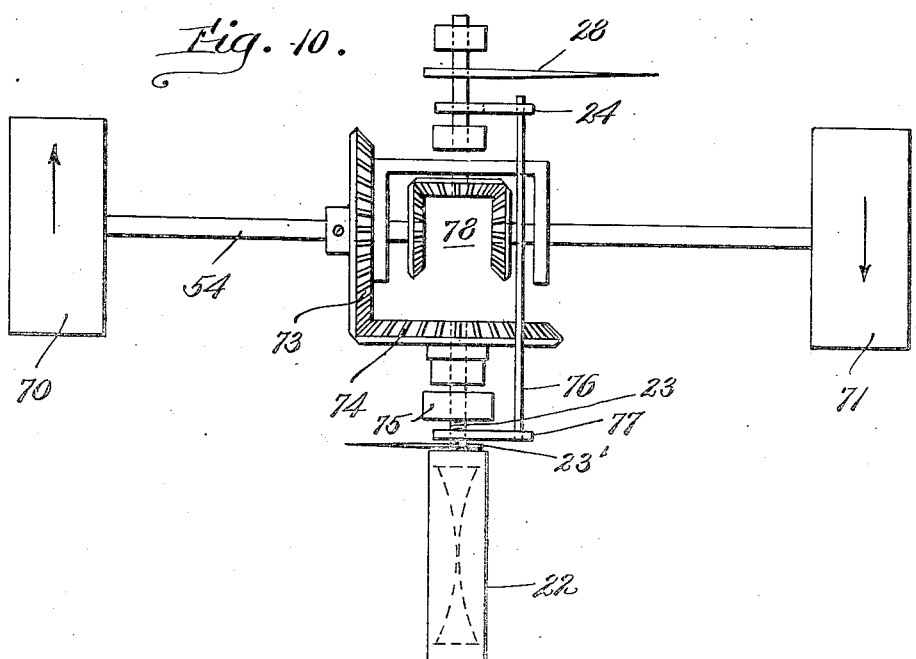
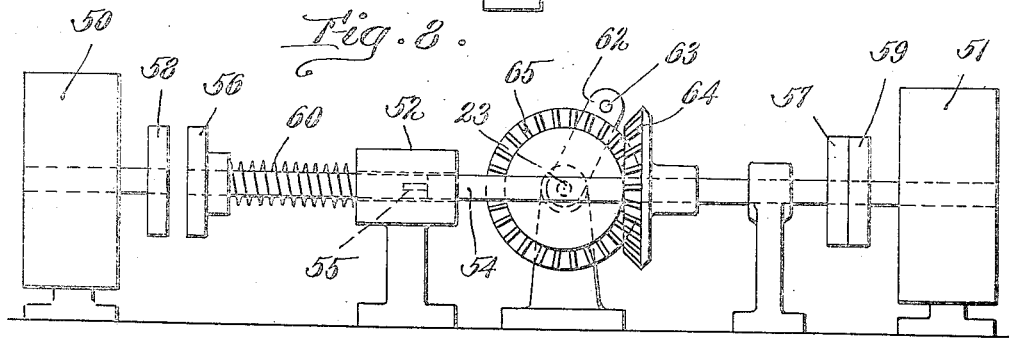
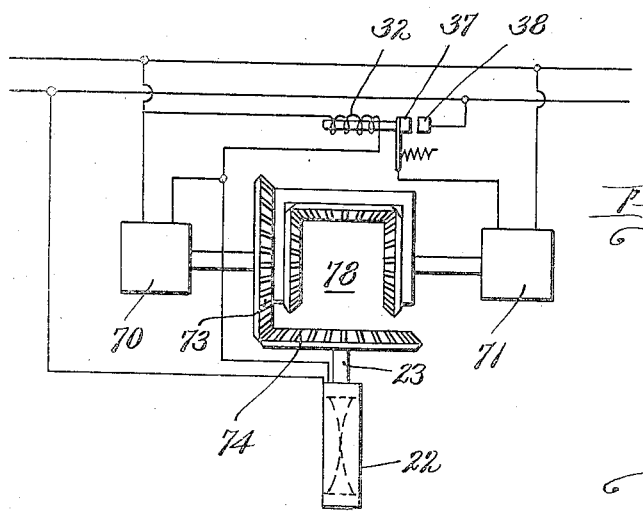

Patented May 1, 1945

2,374,786

UNITED STATES PATENT OFFICE 2,374,786

INDICATING THERMOMETER

Norman J. Smith, Medfield, Mass., assignor to Fenwal Incorporated, Ashland, Mass., a corporation of Massachusetts Application June 3, 1942, Serial No. 445,678

16 Claims. (Cl. 73—339)

This invention relates to an indicating thermometer of the electrically actuated type.

The object of the invention is to provide an indicating thermometer wherein the indicator is operatively associated with the adjustable setting means of a thermostatic switch, and electrically actuated means controlled by the thermostat continuously positions the setting means in accordance with the temperature to which the thermostat is subjected.

The adjustable setting means may be a screw (see patent to W. J. Turenne, No. 2,257,990, October 7, 1941, for example), the electrically actuated means may be a small reversible electric motor (servomotor) or two such motors rotatable in opposite directions, or a combination of such motor or motors and a relay or clutch controlled by a thermostat and arranged to control the circuit of, or otherwise to bring into operation, one of the motors, and the means associating the indicator with the setting means may be any suitable coupling of the lost-motion or delayed action type.

If the adjusting screw of the thermostat is turned by hand, there will be developed in the struts such longitudinal tension that the lateral component thereof will be equal to the breaking strength of the weld formed when the contacts close, and therefore the contacts will be separated. If the screw motion is reversed, the end tension in the struts must be released sufficiently to permit the side force component to develop sufficient pressure between the contacts to allow current to flow between them.

The adjusting screw is provided with a pointer, rigidly secured thereto and rotating therewith, whereby the user can set the thermostat to make or break the circuit in which it is connected at any desired temperature. The angle between positions of this pointer on the thermostat scale at which the thermostat makes and breaks contact may be called the angle of thermostat make and break positions, and the arc on the circumference of the screw that subtends such angle is, of course, the distance in circular degrees between the graduations on said scale which indicate said make and break positions when a stable temperature condition has been reached.

This arc and angle are both substantially constant throughout the temperature range for which the thermostat is designed, and therefore practically the same angle of motion of the adjusting screw is required to make and break contact at any point in said range. The action is purely mechanical and is based on the tension in the struts and the strength of the weld at the contact points.

In carrying out my invention, I use a reversible motor or equivalent means for varying the angular position of the adjusting screw and this is equivalent to turning the screw by hand, insofar as the making and breaking of the thermostat contacts are concerned; that is to say, if the motor, rotating clockwise, turns the screw pointer to a scale graduation slightly above the graduation which represents the temperature of the air under a stable temperature condition, the thermostat will be opened and then by means hereinafter described, the motor, rotating counterclockwise, will turn the screw reversely until said pointer indicates a scale graduation slightly below said temperature, whereupon the thermostat will be closed and the circuit of the motor will again be made for clockwise rotation, and so on. Thus, the temperature setting means is being continuously positioned at the contact making and breaking points, in accordance with the temperature at the thermostat, and in this manner, controls the temperature indicating means. Thus, as soon as a stable temperature condition has been reached, there will be a continuous oscillation of the screw through the angle of the thermostat make and break positions and the indicator by virtue of its connection to the screw through the lost-motion coupling will oscillate through an arc so small that its motion will hardly be apparent.

In the drawings accompanying and forming a part of this specification,

Fig. 2 is an elevation of substantially the same embodiment of the invention shown in Fig. 1.

Fig. 2a is a fragmentary elevation of a modification.

Fig. 3 is an end elevation as seen from the right-hand side of Fig. 2.

Figs. 4 and 4a are sections taken on the line 4—4 of Fig. 2, showing the positions of the fork and rod hereinafter described at the instant the thermostat contacts are opened and closed, respectively.

Fig. 5 is a diagram illustrating the circuit arrangements employed with the apparatus shown in Figs. 1 and 2.

Fig. 8 is an elevation of the apparatus shown in Fig. 6, certain parts being omitted.

Fig. 9 is a diagram showing the circuit arrangements used with the apparatus shown in Fig. 6.

Fig. 10 is a plan view of a third embodiment of my invention.

Fig. 11 is a diagram showing the circuit arrangements used with the apparatus shown in Fig. 10.

Referring to Fig. 2, which like the other figures of the drawings is to be understood to be illustrative, merely, and not restrictive, 20 represents a small low speed motor having two windings so directed that when one is connected to a voltage source, the motor will rotate in a clockwise direction and when the other is energized, counterclockwise. The shaft 20' of the motor is connected directly by the coupling 21 to a thermostatic switch 22, having, in the present instance, a pair of circuit controlling elements 22', 22', and an adjustable setting means, herein shown as a rotatable setting means, viz, the screw 23, which controls the setting of the thermostatic switch and determines the point of response thereof to temperature changes.

It is to be understood that in this embodiment of my invention, as in the other two, a thermostat of the type shown in the patent hereinbefore referred to, or in the patent to W. J. Turenne, No. 2,090,407, April 17, 1937, or any suitable thermostat that opens a circuit on increase of temperature, may be employed; and also, with suitable modifications, that an inverse thermostat of the type shown in patent to T. L. Fenn and W. J. Turenne, No. 2,185,432, January 2, 1940, that makes a contact on increase in temperature, may be used.

Figure 6:
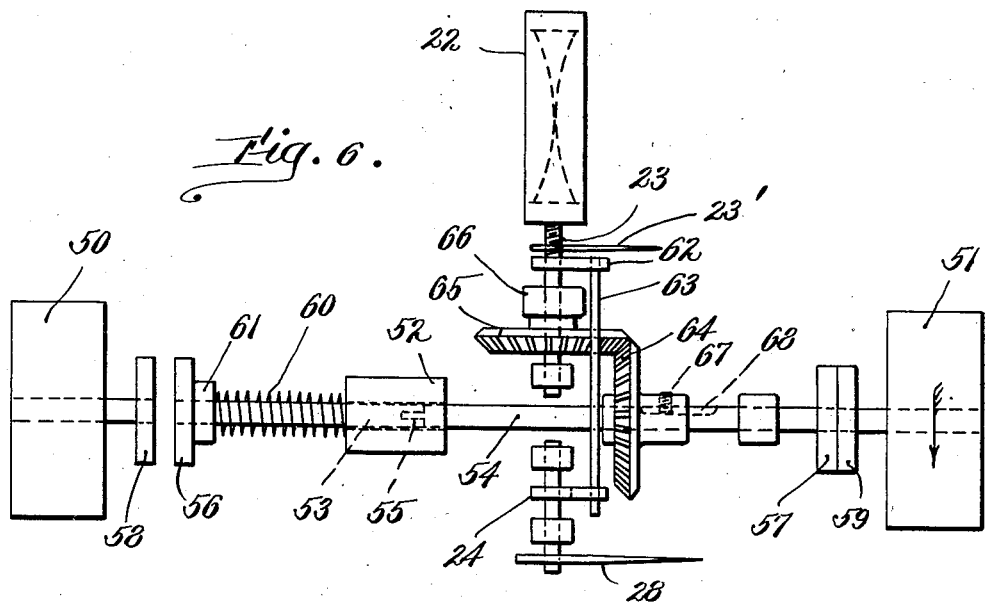
Fig. 6 is a plan view of another embodiment of my invention wherein a magnetic clutch is employed to bring into action, successively, the clockwise running and the counterclockwise running motors, the counterclockwise running motor being coupled to the thermostat setting means in Fig. 6.

While the shaft 20' is connected to the adjusting screw directly, it is obvious that in this form of my invention, as in the other two embodiments thereof shown in Figs. 6 and 10, respectively, suitable reduction gearing may be interposed between the motor shaft and said adjusting screw.

Mounted on the shaft 20' for movement therewith is a fork 24 between the tines of which is disposed one end of a pin 25, the other end being rigidly secured to a driving arm 26 mounted on and affixed to a short shaft 27, on which is mounted, preferably, frictionally, an indicator 28 for movement therewith. Obviously, the shaft 27 may be omitted and the pin connected directly to the indicator which will then be mounted frictionally on a stud 27', coaxial with the shaft 20' and the screw 23, after the manner of the hands of a clock, as shown in Fig. 2a.

As the motor shaft 20' is connected directly to the thermostat setting means 23 it will be apparent that the driving fork will have movement synchronal with that of the setting means, and also that when one of the tines of said fork is in co-operative contact with the pin 25 during periods of unstable temperature condition, the movement of the arm 26 and the indicator 28 will be synchronal with that of the setting means. It is, of course, immaterial whether the fork be the driving member of the coupling interposed between the indicator and the setting means or the driven member thereof as shown in Figures 6 and 10.

The motor shaft 20' and driving arm shaft 27 are suitably journalled, as indicated, and the thermostat casing is held stationary with respect to its adjusting screw in any convenient manner.

Figure 1:
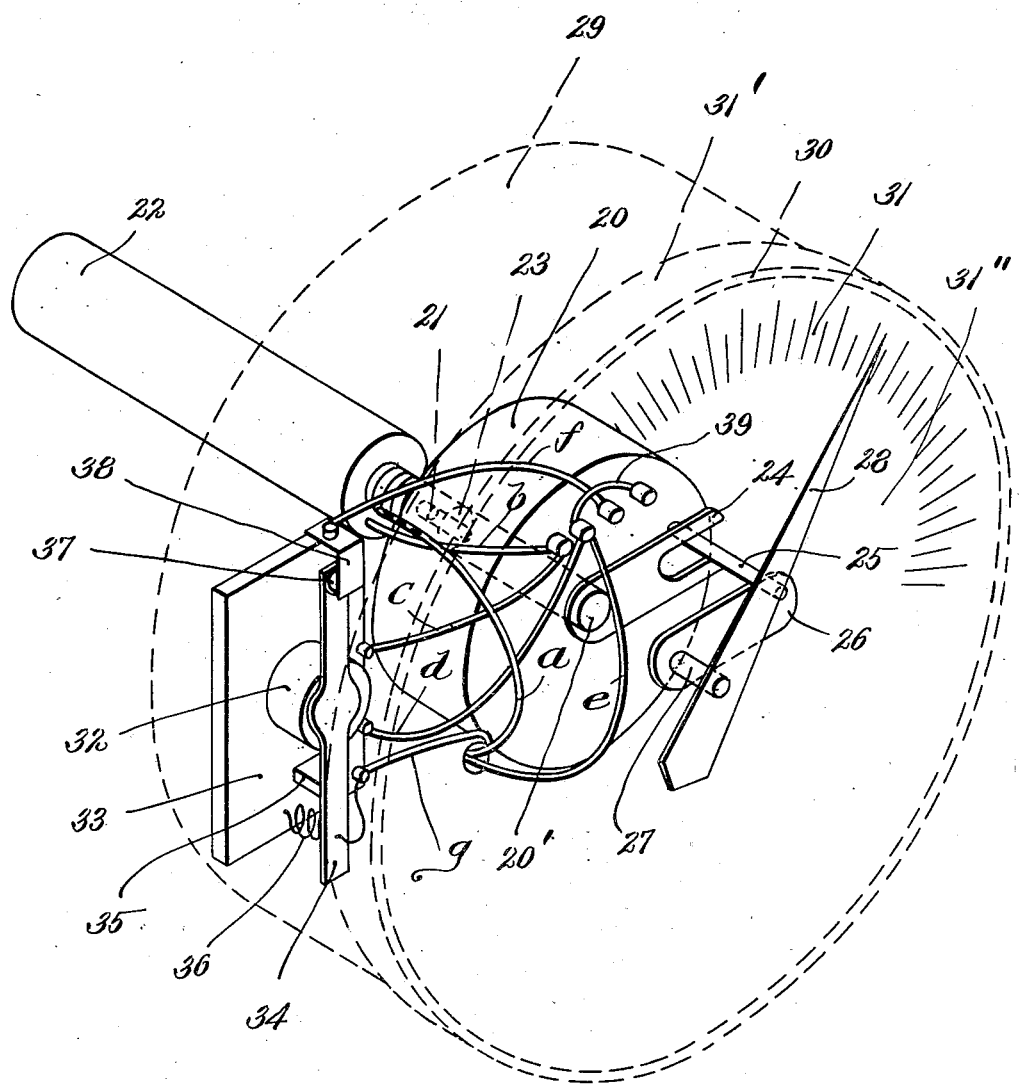
Figure 1 is a perspective view of an indicating thermometer embodying my invention.

The elements shown somewhat schematically in Fig. 2, are all illustrated in Fig. 1, in the manner in which they are used in practice, these elements being enclosed by the casing 29, shown in the present instance as cylindrical, the front face of said casing being closed by a disc 30 provided with a scale 31 disposed to co-operate with the indicator 28. A ring 31', provided with a glass face 31", may be employed to enclose the front end of said casing.

Within the casing, a relay 32 is secured to the vertical plate 33 and is provided with an armature 34 pivotally mounted on said plate at 35 and provided with a tension spring 36 which maintains the upper end of the armature 37 against the stationary contact 38 when the relay is deenergized.

The circuit connections shown in Fig. 5 are as follows: From one side of the voltage source, there is a lead $a$ to one of the contact members of the thermostat (shown closed in Fig. 5) and from the other, a lead $b$ to one of the motor binding posts which is connected to one terminal of one of the motor windings; the other terminal being connected to a binding post, which by the lead $e$ is connected to the other side of the line. Thus when the contacts of the thermostat members are closed, there will be a circuit through that winding of the motor which will cause it to rotate in a given direction, say, clockwise. Shunted across the terminals of the motor winding above mentioned by the leads $c$, $d$, is the coil of the relay 32, the armature of which is connected by the lead $g$ to the same side of the line as the lead $a$. The stationary contact point of the relay is connected by lead $f$ to one of the terminals of the second winding of the motor, which when energized causes the motor to rotate in a counterclockwise direction. The other terminal of said winding is connected by a jumper 39 to the second terminal of the winding first mentioned, which is connected by lead $e$ to the side of the line other than that to which the leads $a$ and $g$ are connected.

As will be obvious, when the thermostat is open, the winding 40 which causes the motor to run clockwise, will be deenergized, the relay will be deenergized, the armature of the relay will be drawn over to the stationary contact 38 by the spring 36 and there will be a circuit through the winding 41 which causes the motor to rotate in a counterclockwise direction. It will now be clear that my improved indicating thermometer comprises, among other things, electrically actuated means (in the present instance, the reversible motor and the relay which when deenergized shifts the circuit from the motor winding 40 to motor winding 41), which continuously varies the position of the temperature setting means in accordance with the temperature at the thermostat and an indicator of any suitable form actuated by the temperature setting means, herein, by way of example, shown as the thermostat adjusting screw, together with a scale in co-operative relation to the indicator.

In Fig. 4 is shown the position of the fork 24 and rod 25 at the instant the clockwise running motor having the winding 40 has turned the screw 23 so that the pointer 23' rigidly secured thereto, indicates a setting slightly above the temperature of the air, say, 70.1°, a stable temperature condition of 70° being assumed, and the thermostat contacts have been opened by the clockwise rotation of said screw, thereby deenergizing said winding. By the coupling comprising said fork and rod, the indicator will now have been moved to 70.1° on its scale. The winding 41 of the counterclockwise running motor is now connected by the relay 32 to the electric source and said motor is about to drive the screw and the fork in a counterclockwise direction.

Fig. 4a shows the position of the parts at the instant the counterclockwise motor has turned the screw in the opposite direction to such an extent that said pointer indicates a setting below the temperature of the air, say, 69.9°, and the thermostat contacts have been closed by the counterclockwise rotation of said screw. By the fork and rod coupling, the indicator will now have been moved to 69.9° on its scale. The thermostat now being closed, the motor having the winding 40 is again energized and turns the screw and fork back to the position shown in Fig. 4, whereupon the thermostat is again opened and the winding 40 deenergized, and so on.

Thus, it will be clear that if a stable temperature condition of 70° exists, there will be a continuous variation through a very small angle of the screw pointer 23' about the graduation 70° on the thermostat dial and of the indicator 28 about the graduation 70° on the indicator scale; and of course this is true of any other temperature within the range of the apparatus to which the thermostat is subjected.

It will therefore be obvious that the distance between the points A, A', on the inner faces of the fork, contacted by the pin during the direct and reverse rotation of the fork, is proportional to the length in circular degrees of the arc on the circumference of the screw which is bounded by the extreme thermostat make and break positions of the screw when a stable temperature condition is established at the thermostat; in other words, that said distance is such that an arc C, struck from the center D of the setting screw (or the center of the motor shaft which is coaxial with said screw) and passing through the center of the pin and bounded by the inner faces of the tines of the fork, subtends the same angle F as the arc E, E', on the circumference of the screw which is bounded by the extreme thermostat make and break positions of said screw when a stable temperature condition is established; and this angle, which limits the angular motion of the screw between the make and break positions thereof and is constant throughout the range for which the thermostat is designed, is herein designated the angle of thermostat make and break positions.

Whatever the temperature at the thermostat may be, the indicator, when a stable temperature condition has been established, will move back and forth over an arc so small that the motion thereof will scarcely be noticeable, being, in fact, that part of the arc C that is intercepted by the circumference of the rod 25 and subtends the angle G.

It will be noted that the inner face of the left-hand tine of the fork is tangential with the rod in Fig. 4 and that the inner face of the right-hand tine is tangential with the rod in Fig. 4a; and that the line H, I, is tangential with the left-hand surface of the rod in Fig. 4 and with the right-hand surface thereof in Fig. 4a. In other words, that the rod in Fig. 4a has been pushed along the arc C by an arcuate distance equal to that portion of said arc C that is intercepted by the circumference of the rod.

If, however, the arcuate distance between the points at which the inner faces of the tines of the fork are contacted by the pin is equal in circular degrees to the length of the arc subtended by the angle of thermostat make and break positions, plus the length of said arc which is intercepted by the circumference of said pin, then the indicator will remain absolutely stationary at the graduation of its scale that represents the temperature to which the thermostat is subjected, the inner sides of the tines of the fork just touching the pin without moving it. This, of course, is the preferred arrangement.

In the modification shown in Fig. 6, the motors 50, 51, are wound for clockwise and counterclockwise rotation, respectively, and are connected with the thermostat setting means by a magnetic clutch actuated, in the present instance, by a solenoid 52 surrounding a rod, the left-hand portion 53 of which is of magnetic material and the right-hand portion 54, of brass or other nonmagnetic material, these two portions being coupled together as indicated at 55, a short distance from the right-hand end of the solenoid.

Clutch members 56, 57, are carried by the respective ends of the rod and co-operate with the clutch members 58, 59, respectively, which are carried by the shafts of the motors. Interposed between the clutch member 56 and the solenoid is a compression spring 60 which surrounds the rod, one end abutting the solenoid and the other, the collar 61, loosely mounted on the rod. The setting screw 23 is coupled to the driving fork 24 by the crank 62 and rod 63.

The setting screw is actuated by the motors 50 and 51 alternately through the bevel gearing 64, 65, and the reducing gearing 66, interposed between the shaft of the gear 65 and the setting screw.

As reducing gearing 66 is interposed between the bevel gear 65 and the setting means, the rod 63, which in this case is the driving member of the lost-motion coupling interposed between the indicator and the setting means, is mounted for rotation on said setting means, with the result that the said rod has synchronal movement with the setting means and the indicator also has such movement when it is in operative contact with either of the tines of the fork 24 during periods of unstable temperature condition.

As will be obvious from the circuit diagram shown in Fig. 9, the solenoid 52 will be energized when the thermostat is closed, in which case the rod 53, 54, will be moved to the right, thereby bringing the clutch members 57, 59, into engagement and also compressing the spring 60, the key 67 which passes through the hub of the gear 64 and enters the keyway 68, permitting such sliding movement of said rod.

Figure 7:
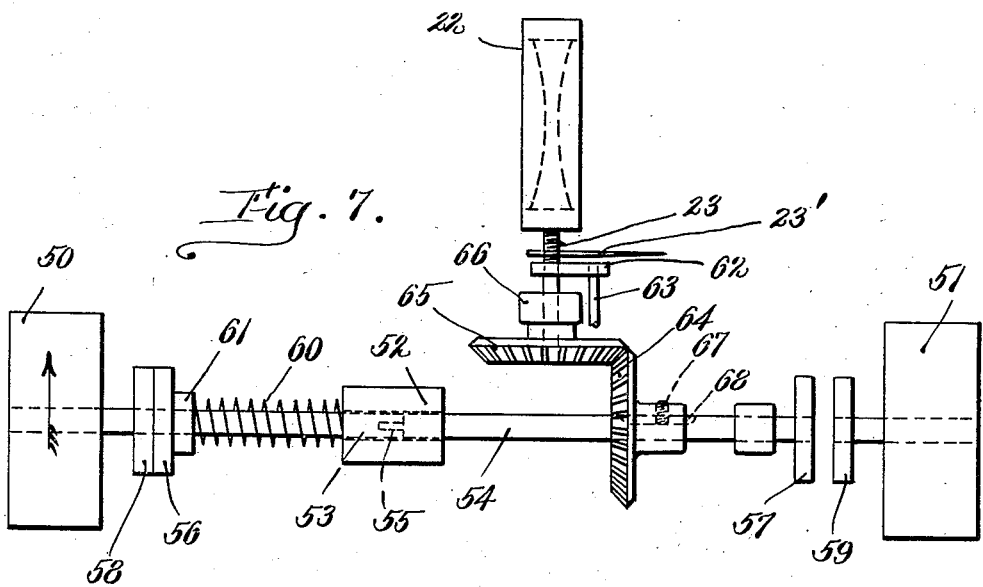
Fig. 7 is a plan view similar to Fig. 6, certain parts being omitted, and the clockwise running motor being coupled to the thermostat setting means.

The thermostat will be closed when the motor 50 has so turned the screw 23 clockwise that the pointer 23' indicates a setting slightly below the temperature to which the thermostat is subjected, and as the solenoid will then be energized, the motor 51 will be clutched to the shaft 64 and the thermostat screw turned by said motor in the opposite direction (Fig. 6). The counterclockwise rotation of said screw by the motor 51 continues until the pointer 23' indicates a setting slightly above the temperature at the thermostat. At this point, the thermostat will be opened by such counterclockwise rotation of its setting screw, the solenoid deenergized and the clutch members 56, 58, forced into engagement by the spring 60, whereupon the motor 50 will turn the setting screw clockwise (Fig. 7) until the pointer 23′ indicates a setting slightly below the temperature at the thermostat and the solenoid is again energized (Fig. 6), and so on, as long as a stable temperature condition is maintained.

The ultimate result is that there will be a continuous variation through a very small angle of the position of the screw pointer 23′ about the mark on the thermostat dial which indicates the thermostat temperature and a practically unnoticeable oscillation of the indicator 28 about the mark on its scale which indicates said temperature, as above set out in connection with the description of the embodiment of the invention shown in Fig. 2, or preferably, the said indicator will remain stationary, indicating the temperature to which the thermostat is subjected, by suitably spacing the tines of the fork 24, as above explained.

As indicated in Fig. 8, the continuously running motors 50, 51, the solenoid, the gearing, and the slidable clutch rod, are all suitably supported and the thermostat is held stationary by appropriate means. In practice, the elements shown in this embodiment of the invention are enclosed within a casing such as indicated in Fig. 1.

In the modification shown in Fig. 10, the motors 70, 71, are not continuously running but the current is shifted from motor 70, which may be assumed to be the clockwise running motor, to the motor 71, which in such case will run counterclockwise, by the relay 32 shown in the circuit diagram (Fig. 11), the operation of which is identical with that heretofore described in connection with Fig. 5. When the thermostat is closed, the clockwise running motor 70 and the relay 32 are energized, and by the bevel gearing 73, 74, interposed between the shaft of the motor 70 and the setting screw 23, the latter is turned in the appropriate direction, there being, if desired, reducing gearing 75 between the bevel gear 74 and the setting screw. By the rod 76, affixed to the crank 77, the motion of the setting screw is transmitted to the fork 24 by means of which the indicator 28 is moved over its scale in the manner heretofore described. As soon as the thermostat opens under conditions heretofore described, the motor 70 and the relay 32 are deenergized, whereupon the relay contacts 37, 38, are closed and the counterclockwise running motor 71 is actuated. Through the differential gearing 78, the setting screw 23 will now be turned in the direction opposite to that in which it was turned when the motor 70 was running.

In Fig. 10 as in Fig. 6, reducing gearing indicated at 75 is interposed between the thermostat setting means and the bevel gear 74, and the crank 77 carrying the rod 76 is mounted on the setting means, with the result that the movement of said crank and rod is synchronal of that of the setting means; and when said rod is in operative contact with the fork 24 during periods of unstable temperature conditions, the indicator has synchronal movement with the setting means. It will be noted, of course, that the indicator is either stationary or substantially stationary when a stable temperature condition has been established at the thermostat, so that it is only when there is a change of temperature that the indicator follows the movement of the setting means.

When a thermostat is used for the purpose herein set forth, the pointer 23′, co-operating with a scale (not shown) to facilitate the setting of the thermostat to maintain a given temperature, may be eliminated. Such pointer, indicated at 23′, is shown herein merely as a convenient means of facilitating the description of the angular movement of a given point on the screw between the "thermostat make and break positions."

If any one of the indicating thermometers herein described is connected to a source of alternating current, as by plugging it into a house service system at a time when the setting of the thermostat is above or below the temperature to which the thermostat is subjected, the indicator 28 will move practically continuously to the point on its scale 31 which represents said temperature, and thereafter as long as the temperature remains constant the setting means will be continuously positioned in a manner above set forth, the indicator either slightly oscillating about the graduation on its scale representing said temperature, or, preferably, will remain stationary, as described in connection with Figs. 4 and 4a.

While I have shown three different mechanical arrangements whereby the angular position of an adjustable setting means of a thermostat may be continuously varied by electrically actuated means controlled by said thermostat, it is to be understood, of course, that I do not limit myself to the particular means disclosed, as it will be obvious to persons skilled in the art that various other mechanical and electrical arrangements may be used for this purpose.

As the power actuation of the setting means of a thermostat by electrical instrumentalities whose operation is controlled by the thermostat is useful for purposes other than indicating temperature, I do not limit myself in this regard, except as required by the appended claims.

Having thus described illustrative embodiments of my invention without, however, limiting the same thereto, what I claim and desire to secure by Letters Patent is:

1. A temperature indicating apparatus comprising in combination, a thermostatic switch having rotatable means for controlling the setting thereof and determining the points of make and break thereof, and electrically actuated means continuously varying the position of said rotatable means in accordance with the temperature to which said thermostat is subjected, said electrically actuated means comprising a reversible motor having two windings, means mechanically connecting the shaft of said motor with said setting means, an electric source, conductors connecting said thermostat in series with one of said windings and said electric source, a relay, said relay including a coil shunted across the winding last mentioned and an armature connected to one pole of said source, a contact point co-operating with said armature and connected to one terminal of the other winding of said motor, means electrically connecting the other terminal of the winding last mentioned to the other pole of said source, and spring means holding said armature on its contact point when said relay is deenergized.

2. A temperature indicating apparatus comprising in combination, a thermostatic switch having adjustable setting means, and electrically actuated means continuously varying the position of said setting means in accordance with the temperature to which said thermostat is subjected, said electrically actuated means comprising a reversible motor, means mechanically connecting the shaft of said motor with said setting means, an electric source, means connecting said thermostatic switch and said motor with said electric source for rotation of said motor in a given direction and switch means controlled by said thermostatic switch for connecting said motor with said source for rotation in the opposite direction.

3. A temperature indicating apparatus comprising in combination, a thermostat having adjustable setting means, and electrically actuated means continuously varying the position of said setting means in accordance with the temperature to which said thermostat is subjected, said electrically actuated means comprising two oppositely disposed electric motors, an electric source, conductors connecting said motors to said electric source for rotation in opposite directions, a magnetic clutch having a solenoid serially connected with said source and said thermostat, and means connecting said setting means with one or the other of said motors for rotation in accordance with the energization or deenergization of said magnetic clutch.

4. A temperature indicating apparatus comprising in combination, a thermostatic switch having adjustable setting means, and electrically actuated means continuously varying the position of said setting means in accordance with the temperature to which said thermostatic switch is subjected, said electrically actuated means comprising two oppositely disposed electric motors, an electric source, conductors connecting said motors to said electric source for rotation in opposite directions, a slidable rod of magnetic material, clutch members carried by the respective ends of said rod, co-operating clutch members carried by the shafts of said motors, respectively, a solenoid surrounding a portion of said rod and serially connected with said thermostat and an electric source, said solenoid being disposed to drive said rod axially in one direction when energized, spring means for driving said rod in the opposite direction upon the deenergization of said solenoid, and means connecting said setting means with one or the other of said motors for rotation in accordance with the energization or deenergization of said solenoid.

5. A temperature indicating apparatus comprising in combination, a thermostatic switch having adjustable setting means, and electrically actuated means continuously varying the position of said setting means in accordance with the temperature to which said thermostatic switch is subjected, said electrically actuated means comprising two electric motors, an electric source, means connecting said motors to said electric source for rotation in opposite directions, differential gearing interposed between said motors, gearing means connecting said setting means with said differential gearing, a relay the coil of which is shunted across the winding of one of said motors, an armature and co-operating contact point for said relay, said armature and contact point being serially connected with the other of said motors and said source, and spring means holding said armature on its contact point when said relay is deenergized.

6. A temperature indicating apparatus comprising in combination, a thermostatic switch having adjustable setting means, and electrically actuated means continuously varying the position of said setting means in accordance with the temperature to which said thermostatic switch is subjected, said electrically actuated means comprising two electric motors, an electric source, means connecting said motors to said electric source for rotation in opposite directions, differential gearing interposed between said motors, gearing means connecting said setting means with said differential gearing, said thermostatic switch being connected between said source and one of said motors, a switch controlled by said thermostatic switch and connected between said source and the other of said motors, and spring means closing said switch when the circuit of the motor first mentioned is open.

7. A temperature indicating apparatus comprising in combination, a thermally responsive switch, rotatable means for controlling the setting thereof and determining the points of make and break thereof, reversible electrically actuated means controlled by said switch, means coupling said setting means to said reversible electrically actuated means for oscillation through the angle of make and break positions of said switch at any given temperature, an indicator, and lost motion means coupling said indicator and said setting means whereby when a stable temperature condition is established said indicator will remain stationary and indicate said temperature.

8. A temperature indicating apparatus comprising in combination a thermostatic switch having rotatable screw-threaded means controlling the setting thereof and determining the points of make and break thereof, reversible electrically actuated means, means coupling said rotatable screw-threaded means to said reversible electrically actuated means, and means governed by said thermostatic switch for controlling the rotation and counter-rotation of said rotatable screw-threaded means, whereby said rotatable screw-threaded means is actuated in accordance with the temperature to which said thermostatic switch is subjected.

9. In a temperature indicating apparatus having a thermostatic switch provided with rotatable means controlling the setting of said thermostatic switch and determining the points of make and break thereof, an indicator, a graduated scale in co-operative relation to said indicator, reversible electrically actuated means controlled by said thermostat for varying the angular position of said rotatable means about a point on said scale representing the temperature to which said thermostatic switch is subjected, and lost-motion coupling means interposed between said indicator and said rotatable means, whereby when a stable temperature condition is established said indicator will remain stationary at the graduation of said scale that represents the temperature to which said thermostatic switch is subjected.

10. In a temperature indicating apparatus having a thermostatic switch provided with a rotatable setting means and reversible motor means controlled by said switch for varying the angular position of said setting means, an indicator and a lost-motion coupling means interposed between said indicator and said setting means, said coupling means comprising a fork mounted for synchronal movement with said setting means and a pin having one end rigidly connected to said indicator and the other disposed between the tines of said fork, the distance between the inner faces of the tines of said fork being greater than the diameter of said pin and being such that an arc struck from the center of said setting means and passing through the center of said pin and bounded by the inner faces of the tines of said fork subtends the angle of the thermostat make and break positions, substantially as herein described and for the purpose set forth.

11. In a temperature indicating apparatus having a thermostatic switch provided with rotatable setting means and reversible motor means controlled by said switch for varying the angular position of said setting means, an indicator and lost-motion coupling means interposed between said indicator and said setting means, said coupling means comprising a fork mounted for synchronal movement with said setting means and a pin having one end rigidly connected to said indicator and the other disposed between the tines of said fork, the distance in circular degrees between the points on the inner faces of the tines of the fork contacted by the pin during the direct and reverse movement of said fork being proportional to the length in circular degrees of the arc subtended by the angle of the thermostat make and break positions, substantially as herein described and for the purpose set forth.

12. In a temperature indicating apparatus having a thermostatic switch provided with rotatable setting means and reversible motor means controlled by said switch for varying the angular position of said setting means, an indicator and lost-motion coupling means interposed between said indicator and said setting means, said coupling means comprising a fork mounted for synchronal movement with said setting means and a pin having one end rigidly connected to said indicator and the other disposed between the tines of said fork, the distance in circular degrees between the points on the inner faces of the tines of the fork contacted by the pin during the direct and reverse movement of said fork being equal in circular degrees to the length of the arc subtended by the angle of the thermostat make and break positions, plus that portion of the length of an arc struck from the center of the setting means and passing through the center of the pin which is intercepted by the circumference of said pin, substantially as herein described and for the purpose set forth.

13. In a temperature indicating apparatus having a thermostatic switch provided with a rotatable setting means and reversible motor means controlled by said switch for varying the angular position of said setting means, an indicator and means for transmitting the motion of said setting means to said indicator, said means comprising a fork mounted for oscillation by said motor means and a pin having one end rigidly connected to said indicator and the other disposed between tines of said fork, the distance between the inner faces of the tines of said fork being greater than the diameter of said pin and being such that an arc struck from the center of said rotatable setting means and passing through the center of said pin and bounded by the inner faces of the tines of said fork subtends the angle of the thermostat make and break positions, substantially as herein described and for the purpose set forth.

14. In a temperature indicating apparatus having a thermostatic switch provided with a rotatable setting means and reversible electrically actuated means controlled by said switch for varying the angular position of said setting means, an indicator and means transmitting the motion of said setting means to said indicator, said means comprising a pin mounted for oscillation on said setting means and a fork rigidly connected to said indicator, one end of said pin being disposed between the tines of said fork, the distance in circular degrees between the points on the inner faces of the tines of said fork contacted by said pin during the direct and reverse movement thereof being proportional to the length in circular degrees of the arc subtended by the angle of thermostat make and break positions, substantially as herein described and for the purpose set forth.

15. In a temperature indicating apparatus having a thermostatic switch provided with rotatable setting means and reversible electrically actuated means controlled by said switch for varying the angular position of said setting means, an indicator and means transmitting the motion of said setting means to said indicator, said means comprising a pin mounted for oscillation on said setting means and a fork rigidly connected to said indicator, one end of said pin being disposed between the tines of said fork, the distance in circular degrees between the points on the inner faces of the tines of said fork contacted by said pin during the direct and reverse movement thereof being equal in circular degrees to the length of the arc subtended by the angle of thermostat make and break positions plus the length in circular degrees of that portion of an arc struck from the center of the setting means and passing through the center of the pin which is intercepted by the circumference of said pin, substantially as herein described and for the purpose set forth.

16. In a temperature indicating apparatus having a thermostatic switch provided with a rotatable setting means and reversible electrically actuated means controlled by said switch for varying the angular position of said setting means, an indicator and lost-motion means transmitting the motion of said setting means to said indicator, said means comprising two co-operatable elements, means mounting one of said elements for synchronal movement with said setting means, and means mounting the other of the said elements to transmit the movement of the first to said indicator during the periods of unstable temperature condition at the thermostat whereby during periods of stable temperature condition at the thermostat said indicator will remain stationary and indicate the same.

NORMAN J. SMITH.